United States Patent [19]

Rees et al.

[11] 4,368,018
[45] Jan. 11, 1983

[54] TRANSPORTER FOR INJECTION-MOLDED PARTS OR INSERTS THEREFOR

[75] Inventors: Herbert Rees, Willowdale; Klaus B. Fritzsche, Aurora, both of Canada

[73] Assignee: Husky Injection Molding Systems Inc., Bolton, Canada

[21] Appl. No.: 311,452

[22] Filed: Oct. 14, 1981

[51] Int. Cl.³ .......................... B29C 7/00; B29F 1/14
[52] U.S. Cl. .................................... 425/138; 425/139; 425/165
[58] Field of Search ............... 425/138, 139, 165, 441, 425/442, 444

[56] References Cited
U.S. PATENT DOCUMENTS

| | | | |
|---|---|---|---|
| 3,454,991 | 7/1969 | Rees | 425/441 X |
| 3,700,375 | 10/1972 | Rees | 425/444 X |
| 3,804,568 | 4/1974 | Rees | 425/442 X |
| 3,990,501 | 11/1976 | Fisher et al. | 425/444 X |
| 4,204,824 | 5/1980 | Paradis | 425/441 X |
| 4,243,364 | 1/1981 | Rees et al. | 425/444 X |

Primary Examiner—J. Howard Flint, Jr.
Attorney, Agent, or Firm—Karl F. Ross

[57] ABSTRACT

One of two relatively movable platens of an injection-molding machine carries a housing in which a cylindrical cam with a generally helicoidal groove is rotatably lodged, the cam being rigid with a shaft disposed parallel to the direction of platen motion. A cam follower on the inner surface of that housing engages in the helicoidal groove whereby the shaft is rotated during relative reciprocation of the platens; a hub idling on the opposite shaft end, supported by a control box on the other platen, can be positively coupled to the shaft by a clutch in this box so as to rotate therewith. An elbow coupled with that hub, directly or through a carriage having a rack in mesh with a gear fixed to the hub, supports a pick-up head which in the engaged state of the clutch enters between two separated mold portions respectively carried by the platens for extracting a freshly molded workpiece from the mold or, possibly, placing an externally supplied insert in an empty mold cavity.

11 Claims, 12 Drawing Figures

TRANSPORTER FOR INJECTION-MOLDED PARTS OR INSERTS THEREFOR

FIELD OF THE INVENTION

Our present invention relates to an injection-molding machine having means for transporting freshly molded workpieces from the machine to another location and/or delivering inserts from such remote location to one of the mold portions for depositions therein or thereon just before a molding operation.

BACKGROUND OF THE INVENTION

In commonly owned U.S. Pat. Nos. 3,454,991, 3,700,375, 3,729,103 and 3,804,568 there have been disclosed a variety of take-off members interposable between two relatively movable mold portions in their separated position for the removal of newly formed workpieces from the mold. Another device of this type is described in U.S. Pat. No. 4,204,824. An essential feature of all these systems is the synchronization of the take-off mechanism with the mold drive in order to insure that the extraction of the molded workpiece takes place well before the reclosure of the mold. Whether the mechanism is used for extraction or insertion, a holding member interposable between the mold portions must be capable of rapidly gripping or releasing the transported element during its juxtaposition with one of the mold portions.

Generally, the stroke of the mold drive must be adjustable to accommodate molds of different height in the direction of platen motion. Especially with a mechanical coupling between the mold drive and the transporter (which is more reliable than an electrical synchronization) it is necessary to allow for such stroke adjustment while ensuring correct operation under all circumstances.

OBJECTS OF THE INVENTION

An important object of our present invention, therefore, is to provide relatively simple means in an injection-molding machine for positively coupling the mold drive with a transporter of the aforedescribed character in a manner satisfying this requirement.

Another object is to provide, in an assembly of this type, a transporter with a pick-up head selectively usable for extracting workpieces from either of the two relatively movable mold portions and/or for depositing inserts in or on one or the other mold portion.

SUMMARY OF THE INVENTION

In accordance with our present invention, a structure rigid with one of two relatively movable platens of an injection-molding machine has mounted thereon a rotary member which is positively connected with a transporter and which, with the aid of clutch means on that structure, can be coupled with a shaft coaxial therewith extending in the direction of relative platen reciprocation toward the other platen. A rotary cam on an end of this shaft remote from the first platen has a cylindrical surface with a generally helicoidal cam track engaged by a cam follower rigid with the second platen whereby the shaft is rotated in one sense during the mold-closing stroke and in the opposite sense during the mold-opening stroke; the cam track terminates in two axially extending extremities, parallel to the direction of platen motion, which hold the shaft stationary in the final phase of each stroke. Upon operation of the aforementioned clutch means, the rotary member—preferably a hub normally idling on the shaft—is driven and moves the transporter in a transverse plane away from the path of the platens toward an external location during a mold-closing stroke and toward that path during a mold-opening stroke in order to transfer articles between a mold portion on at least one of the platens and the external location.

According to a more particular feature of our invention, the transporter may comprise an elbow which in a simple case is rigid with the clutch-controlled hub. In a more elaborate embodiment, the transporter is mounted on a carriage and has an arm parallel to a laterally extending beam on which that carriage is rectilinearly guided and which forms part of the aforementioned structure, a pick-up head being secured to a rod that is parallel to and journaled on that arm. The hub in that case is secured to a gear meshing with a rack on that carriage. The rod is linked with control means on the carriage for being rotated together with the pick-up head through an angle of up to about 90° as the carriage approaches the external location. The beam, for this purpose, is advantageously provided with a generally linear track which has a curved extension remote from the first platen, the control means comprising a crank which is pivoted on the carriage and has a projection engaging the guide track; the crank is linked to the rod via a pitman.

The pick-up head of our improved transporter may be provided with two oppositely facing releasable holding means for substantially concurrently extracting a freshly molded workpiece from one mold portion and delivering an insert to the other mold portion for subsequent incorporation in the next workpiece to be molded.

BRIEF DESCRIPTION OF THE DRAWING

The above and other features of our invention will now be described in detail with reference to the accompanying drawing in which:

FIG. 9 shows a protective circuit associated with the machine of FIGS. 1-8;

SPECIFIC DESCRIPTION

Figure 1:
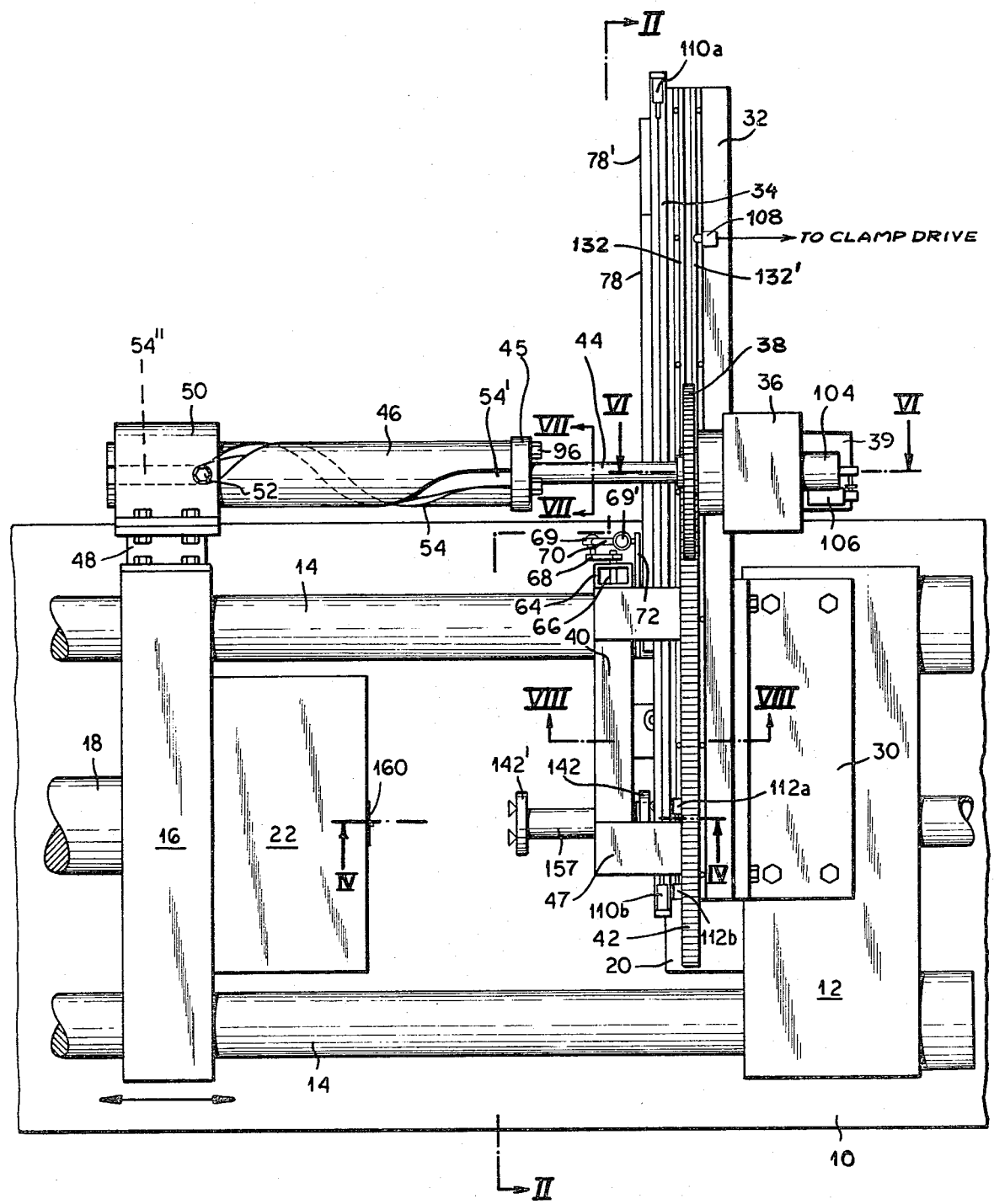
FIG. 1 is a plan view of an assembly, incorporating our present improvement, of a horizontal injection-molding machine (illustrated only in part) with a transporter shown in a take-off position between two separated mold portions.
Figure 3:
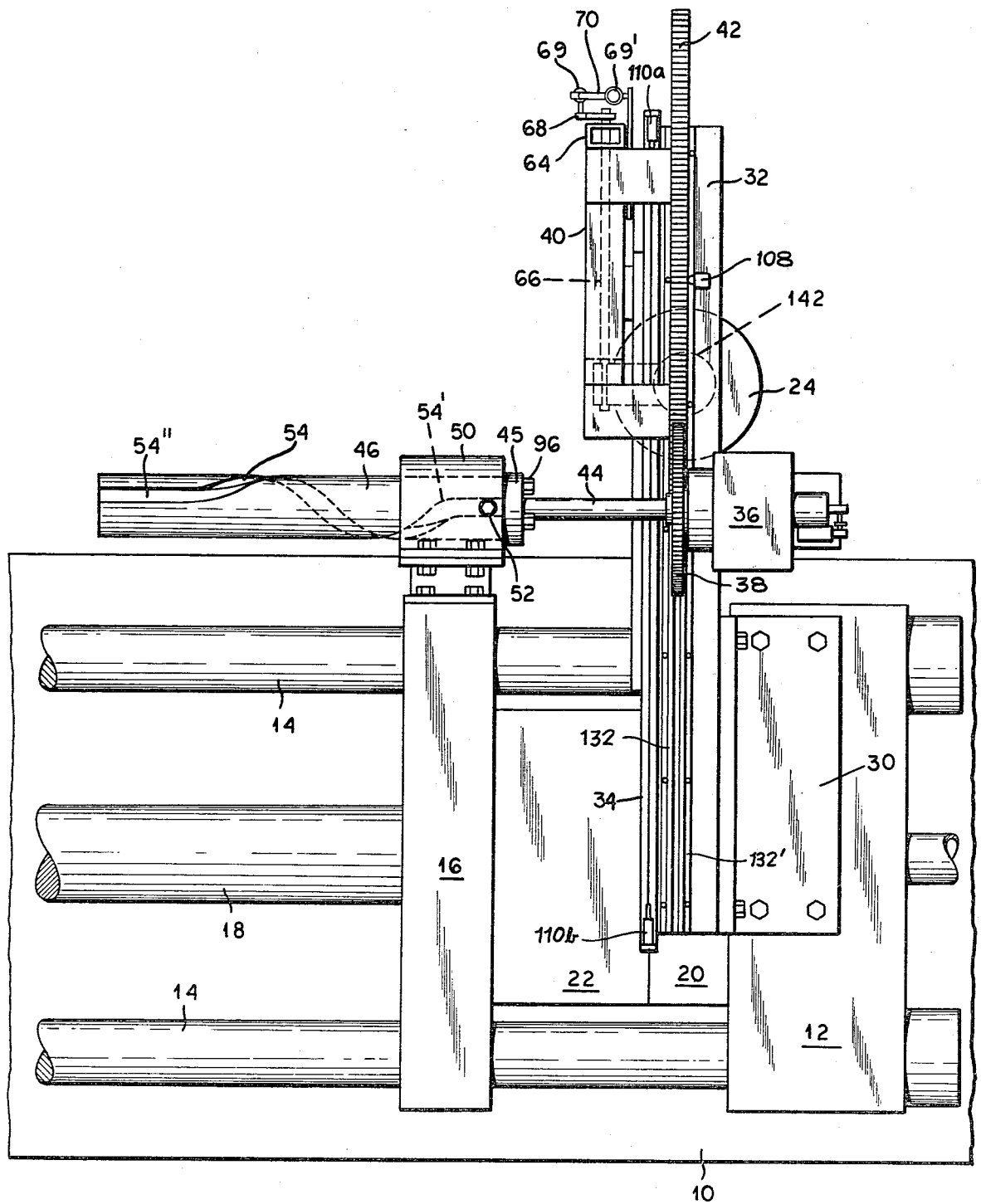
FIG. 3 is a plan view similar to FIG. 1, showing the transporter in an outlying position with the mold closed.

As shown in FIGS. 1 and 3, a largely conventional injection-molding machine comprises a bed 10 supporting a stationary platen 12 which is linked by a set of tie bars 14 with a movable platen 16. The latter is reciprocable above bed 10 by a drive mechanism represented only by a ram 18. Platens 12 and 16 support respective mold portions 20 and 22, mold portion 20 forming a cavity 21 (FIG. 4) for the production of a disk-shaped workpiece 24 such as, for example, a phonograph record.

A structure rigid with stationary platen 12 comprises a bracket 30 supporting a laterally extending horizontal beam 32. This beam forms a rail 34 along which a carriage 40 is slidable between an in-line working position shown in FIG. 1 and an outlying position illustrated in FIG. 3. Such displacement can be effected, in synchronism with the reciprocation of platen 16, with the aid of a transfer mechanism including a control box 36 secured to beam 32, a gear 38 on a shaft 44 journaled in that control box, a rack 42 rigid with carriage 40 and in mesh with gear 38, and a cylindrical cam 46 fixedly secured to shaft 44 by means of a flange 45 rigid with the shaft and mounting bolts 96 traversing that flange. The opposite end of cylinder 46 is rotatably lodged in a housing 50 which is connected by means of a bracket 48 with the movable platen 16.

Cylinder 46 has a cam track in the form of a helical groove 54 with extremities 54', 54" parallel to the cylinder axis and to the direction of reciprocation of platen 16. Groove 54, shown to encompass nearly a fully pitch of the helix, is engaged by a cam follower 52 in the form of a pin which is fixedly retained by housing 50 and preferably carries a roller entering the cam track. When the platen 16 is moved to the right from the mold-open position of FIG. 1 to the mold-closed position of FIG. 3, cylinder 46 executes almost one complete revolution. In the terminal phase of the mold-closing stroke, during which the cam follower 52 coacts with the straight terminal section 54' of the track, the cylinder remains stationary; this is also the case when the mold-opening stroke of ram 18 is extended to the left of the position of FIG. 1 so that cam follower 52 coacts with the straight terminal section 54".

By means of a clutch assembly in box 36, more fully described hereinafter with reference to FIG. 6, gear 38 can be selectively coupled with or decoupled from the shaft 44. When coupled with that shaft, gear 38 drives the rack 42 and with it the carriage 40 which moves from the outlying position of FIG. 3 to the in-line position of FIG. 1 during a mold-opening stroke and back into the outlying position during the mold-closing stroke. Carriage 40 forms part of a transporter including a pick-up head 60 mounted on a rod 66 which is journaled in an arm 62 of an elbow whose other arm 64 is fixedly secured to the carriage. Pick-up head 60 carries a pair of holding tools 142 and 142' respectively facing the platens 12 and 16 in the working position of FIGS. 1 and 2; see also FIG. 4. Rod 66, which like arm 62 extends horizontally and transversely to the direction of platen motion, is provided at its end remote from head 60 with a lever 68 (best seen in FIG. 5) which is articulated by a ball joint 69 to the lower extremity of a substantially vertical pitman 70 whose upper extremity is articulated by a similar ball joint 69' to a crank 72. The latter is fulcrumed at 74 (see also FIG. 8) to the carriage 40 and has a pin 76 received as a cam follower in a slot 77 of an elongate guide member 78 rigid with beam 32, slot 77 constituting a straight horizontal cam track terminating in a sloping section 77' on an extension 78' of member 78. The terminal track section 77' may be of such shape that, as the carriage 40 approaches the outlying end of beam 32, crank 72 pivots clockwise (as viewed in FIG. 2) through an angle sufficient of impart a 90° rotation to lever 68 whereby the pick-up head 60 is swung from the vertical position of FIG. 4 into a horizontal position in which the holding tools 142 and 142' respectively lie below and above that head. Extension 78' may be replaced by a similar piece with a different track section 77' for a modification of the swing angle of pick-up head 60.

Figure 4:
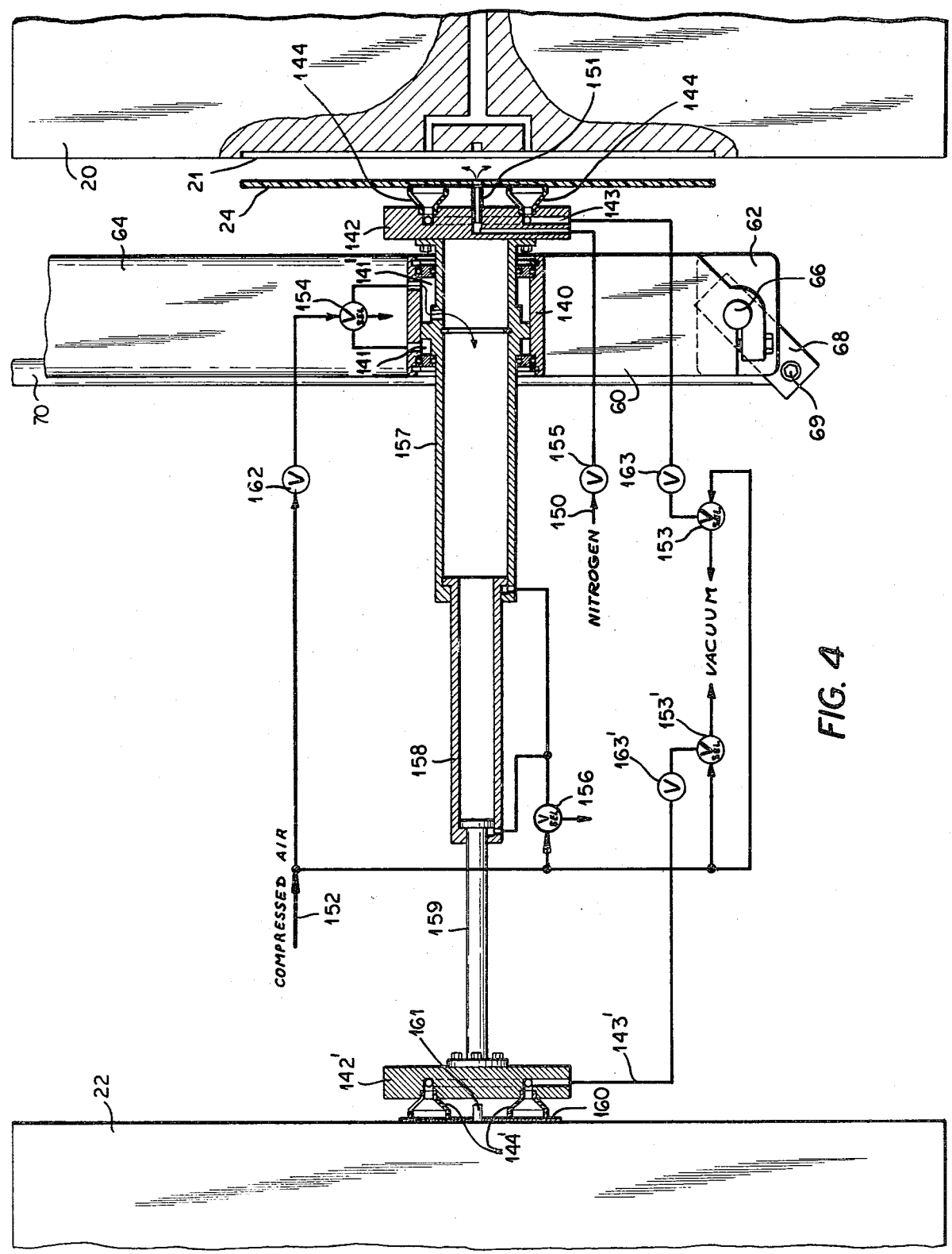
FIG. 4 is a cross-sectional view taken on lines IV—IV of FIGS. 1 and 2 but drawn to an enlarged scale, showing details of a pick-up head of the transporter in an extended position.
Figure 5:
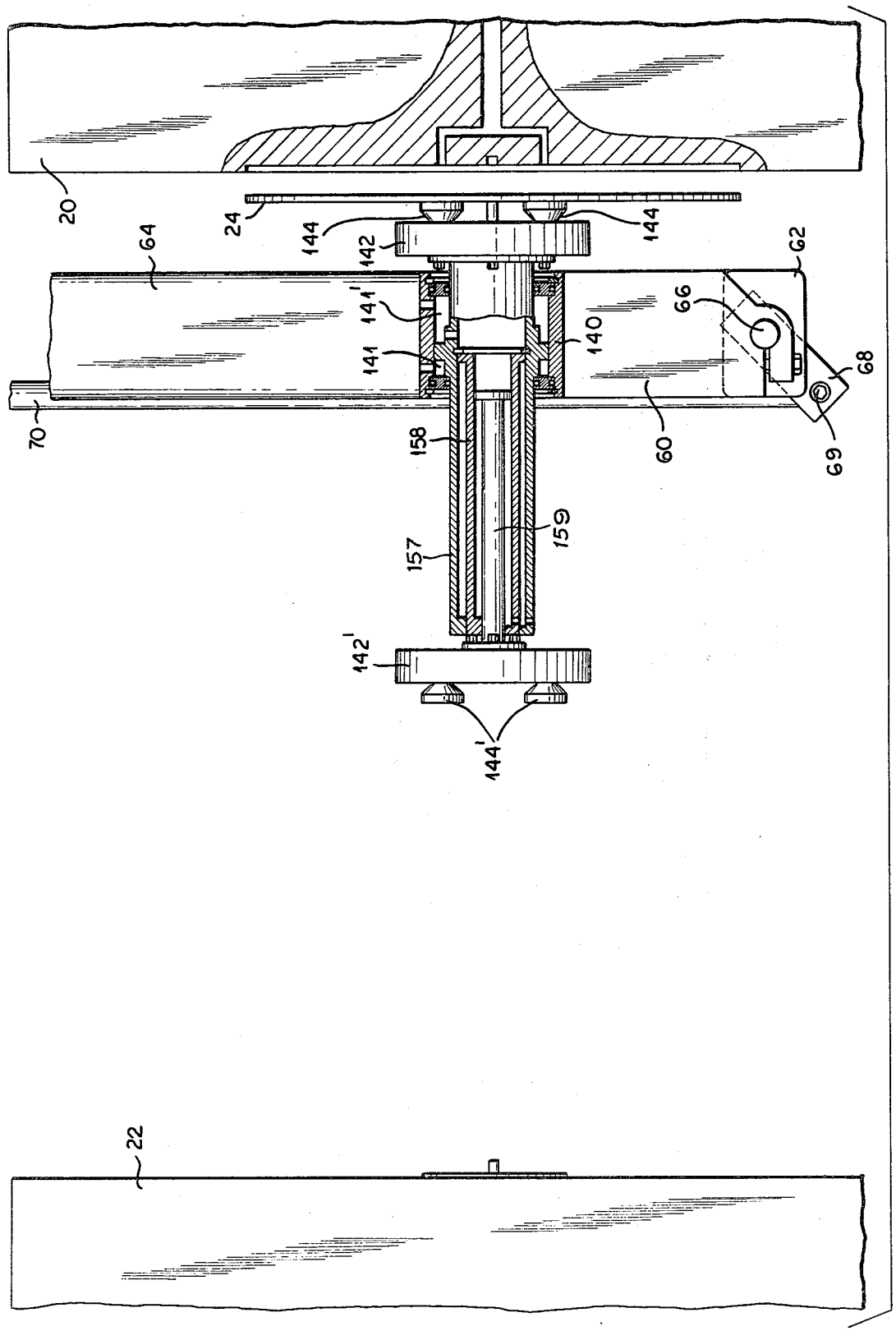
FIG. 5 is a view similar to FIG. 4 but showing the pick-up head in a contracted position.

As seen in FIGS. 4 and 5, the two holding tools 142 and 142' are equipped with respective sets of suction cups 144 and 144' communicating with flexible conduits 143, 143' which may be selectively connected to a source of compressed air, represented by a line 152, or to a vacuum. The conduits 143, 143' are provided for this purpose with switching valves 153, 153' and associated shut-off valves 163, 163' which can be operated by a suitably programmed controller (not shown) triggerable by the arrival of carriage 40 in either of its limiting positions. A cylinder 140 forming part of head 60 is traversed by a tubular piston 157 constituting a telescoped assembly with two other pistons 158, 159; holding tools 142, 142' are mounted on pistons 157 and 159, respectively. Compressed air from line 152 can also be delivered via a shut-off valve 162 and a switching valve 154 to either one of two compartments 141, 141' in cylinder 140; the admission of compressed air to compartments 141 drives the piston 157 to the right as viewed in FIGS. 4 and 5 whereas the pressurization of compartments 141' drives that piston to the left and also extends the pistons 158 and 159 if the interior of pistons 157 and 158 is vented to the atmosphere via a further switching valve 156; when valve 156 is operated to pass compressed air from line 152, the telescoped assembly is prevented from expanding or is restored to the contracted position of FIG. 5 if compartment 141' is simultaneously vented to the atmosphere via valve 154. Still another shut-off valve 155 enables an inert gas such as nitrogen under pressure to be fed from a line 150 to a nozzle 151 of holding tool 142, a jet of this gas passing through a central hole of the disk-shaped workpiece 24 to the opposite surface of that workpiece so as to assist in its dislodgment from the mold cavity 21 by the suction cups 144 which are simultaneously connected to vacuum. After the pick-up head has been transported by carriage 40 to the outlying location, compressed air from line 152 is admitted to suction cups 144 in order to release the workpiece onto a conveyor or into a receptacle not shown.

Suction cups 144' of holding tool 142' may also be alternately connected to high-pressure line 152 and to vacuum for the purpose of transporting an insert 160, e.g. a label for the disk 24, from the remote station to the mold portion 22 which has a pin 161 traversing a central hole of that insert. Thus, the insert 160 will become embedded in the workpiece 24 produced during the next molding cycle. Tools 142, 142' may operate more or less simultaneously in the transporter position of FIG. 4.

Figure 6:
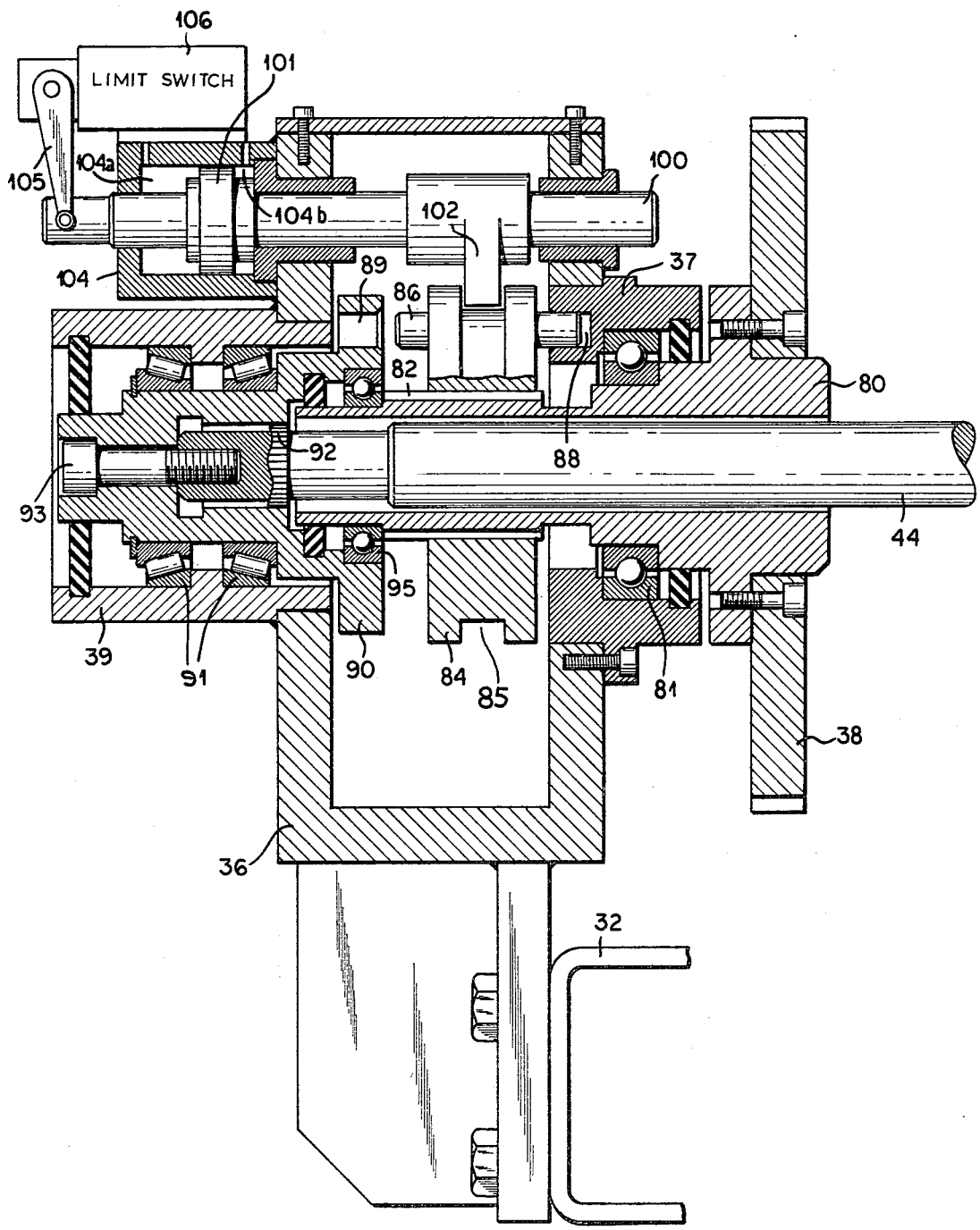
FIG. 6 is a cross-sectional view, also drawn to an enlarged scale, taken on the line VI—VI of FIG. 1.
Figure 7:
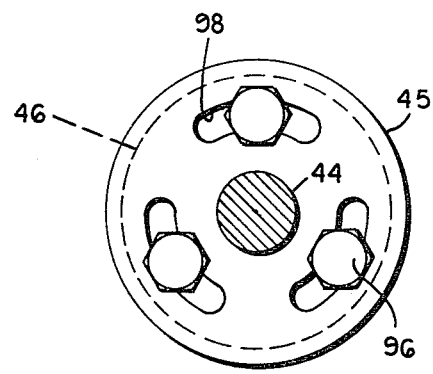
FIG. 7 is a sectional detail view taken on the line VII—VII of FIG. 1 and likewise drawn to an enlarged scale.

In FIG. 6 we have shown details of the control box 36 and its clutch assembly. Shaft 44 rotates freely inside a hub 80 of gear 38, this hub being journaled via a ball bearing 81 in a sleeve 37 rigid with box 36. Another such sleeve 39 rotatably supports, via ball bearings 91, a hub 90 which is secured to the end of shaft 44 by splines 92 and a screw 93 while resting via another ball bearing 95 on an extension of hub 80. A collar 84 slidable on splines 82 of hub 80 carries a pin 86 having axially projecting extremities alignable with bores 88 and 89 of sleeve 37 and hub 90, respectively. Collar 84 may be axially shifted by a lug 102 entering a groove 85, the lug being carried on an actuating rod 100 which is parallel to shaft 44 and is provided with a piston head 101 inside a double-acting air cylinder 104. An end of rod 100 is coupled with an arm 105 of a limit switch 106 which, as more fully described hereinafter, lies in series with an operating circuit for the mold drive represented by ram 18. Switch 106 is so designed that this operating circuit is closed only when rod 100 is in one or the other of its extreme positions in which pin 86 engages either in bore 88 (as shown in FIG. 6) or in bore 89. These positions can be established by the selective admission of compressed air via a manually operable valve (not shown) into a respective compartment 104a, 104b of cylinder 104, with resulting immobilization of gear 38 in the first instance and positive coupling thereof with shaft 44 in the second instance. It should be noted that pin 86 is long enough to have an intermediate position in which the two studs constituted by its extremities are received simultaneously in the two associated bores 88 and 89 if hub 90 is properly aligned with stationary sleeve 37; thus, a changeover from one operating clutch position to the other is possible only when shaft 44 is in a particular rotary position, namely that corresponding to mold closure when pin 52 (FIGS. 1 and 3) engages the terminal section 54' of track 54. As long as shaft 44 carries out less than one complete revolution during a stroke of platen 16 (track section 54" being slightly offset from track section 54' for this purpose), no untimely release of gear 38 from shaft 44 can occur. The bolts 96 pass through flange 45 via slots 98, FIG. 7, which establish a certain angular clearance facilitating a precise relative adjustment of shaft 44 and cylinder 46.

Figure 2:
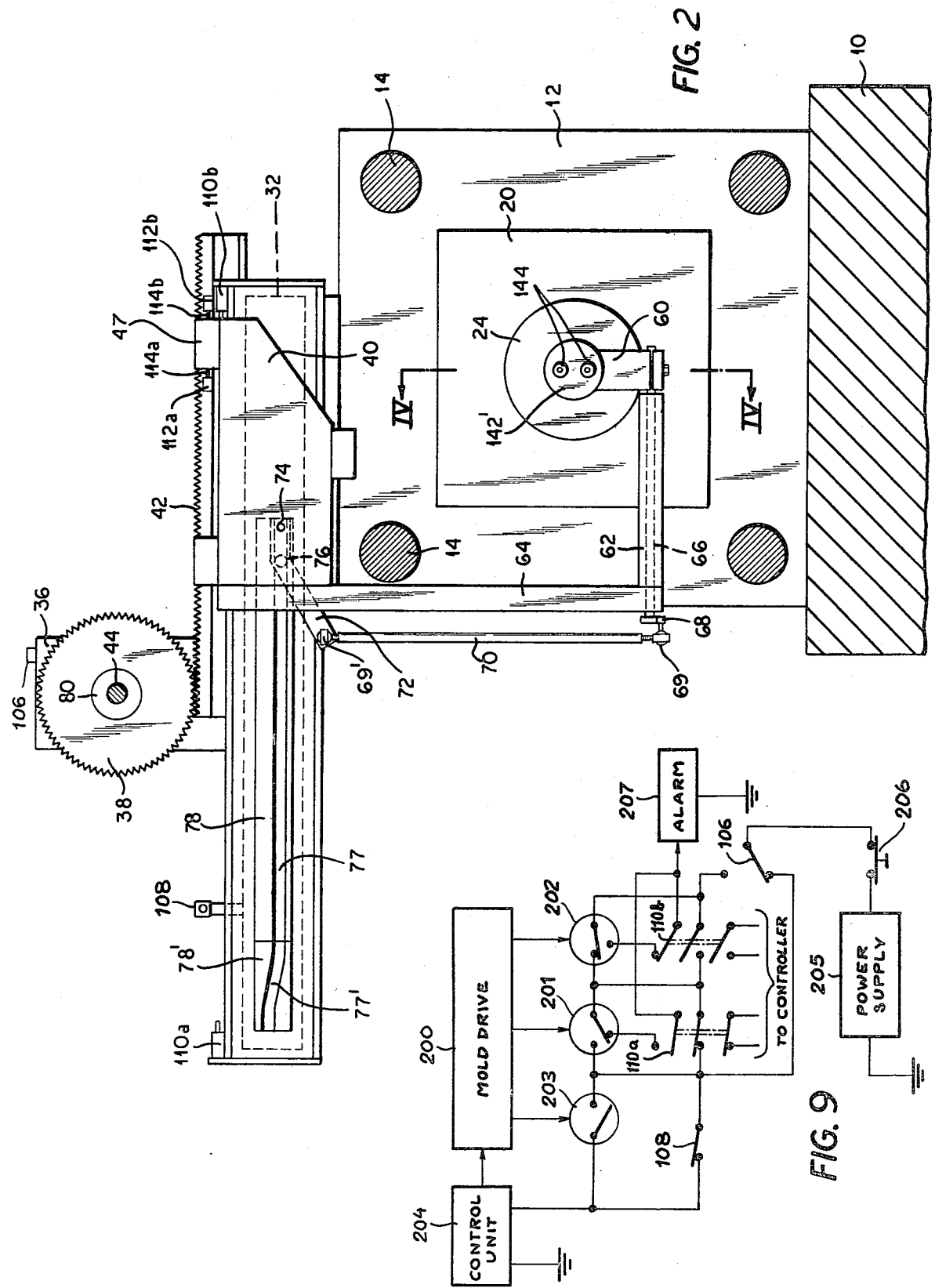
FIG. 2 is a cross-sectional view taken on the line II—II of FIG. 1 and showing the transporter in elevation.

The arrival of carriage 40 at either end of rail 34 is detected by respective limit switches 110a and 110b mounted on beam 32 as seen in FIGS. 1–3. The function of these limit switches is to trigger the aforementioned controller commanding the seizure or the release of an article; as described hereinafter with reference to FIG. 9, they can also be used to arrest the mold drive and to emit an alarm signal if, for any reason, the carriage has not arrived in the proper position at the end of a platen stroke when the gear 38 is coupled with shaft 44 via collar 84, pin 86 and hub 90 as determined by the switch 106. Another switch 108 coacts with rack 42 to monitor the withdrawal of carriage 40 from the path of movable mold portion 22.

Figure 8:
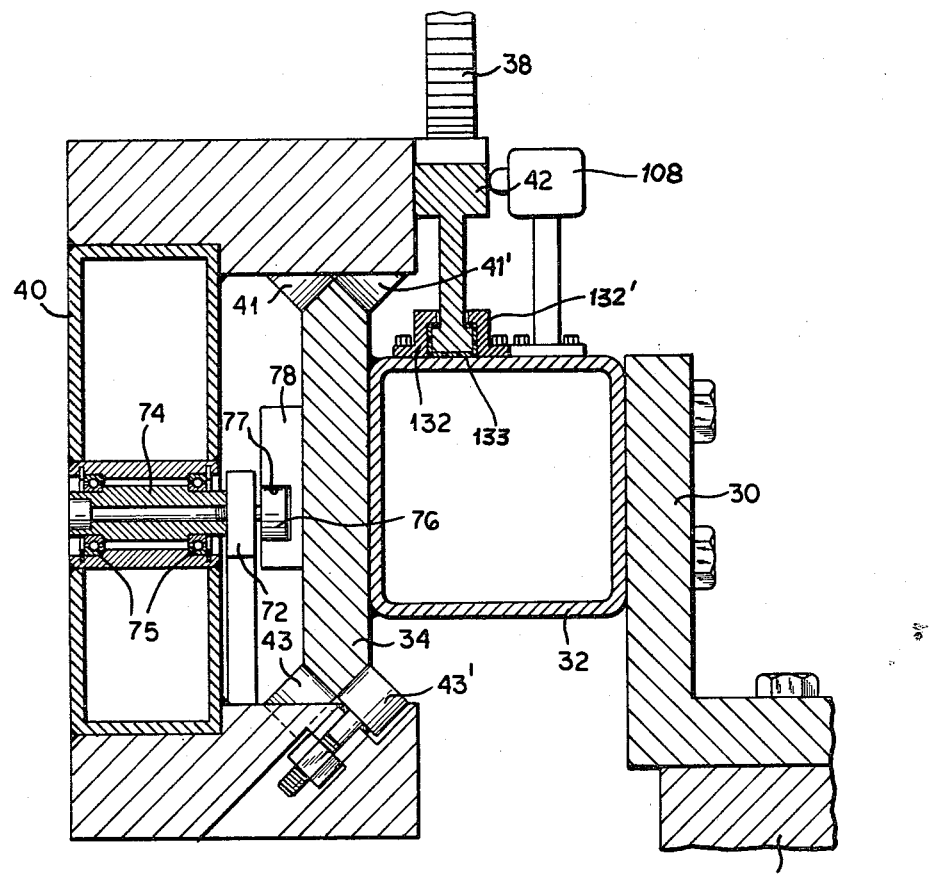
FIG. 8 is a cross-sectional view, again on an enlarged scale, taken on the line VIII—VIII of FIG. 1.

As shown in FIG. 8, the rack 42 is designed as an I-beam with a toothed upper flange and a somewhat smaller lower flange; the latter is supported on an antifriction (e.g. Teflon) layer 133 and bracketed by guides 132, 132' which are bolted to the beam 32. The exact position of the rack 42 relative to carriage 40 is determined by blocks 112a, 112b, FIGS. 1 and 2, which are fixed to the upper flange of the rack and have screws 114a, 114b bearing from opposite sides upon a transverse rib 47 of the carriage. The rail 34, welded to beam 32, has mitered upper and lower edges bracketed by pairs of relatively offset guide rollers 41, 41' and 43, 43' which are partly recessed in upper and lower flanges of the carriage 40 shown to have a generally C-shaped profile. The fulcrum 74 of crank 72 is shown in FIG. 8 to be journaled by ball bearings 75 in the hollow web of the carriage.

In FIG. 9 we have shown a protective circuit including the aforementioned switches 106, 108, 110a, 110b along with three further switches 201, 202, 203 controlled by the mold drive which has been schematically represented at 200. An associated control unit 204 normally enables the energization of that drive from a power supply 205 upon closure of a master switch 206. Switch 106, lying in series with switch 206, establishes an operating circuit for control unit 204 only when in one or the other of its limiting positions, as discussed above. Its illustrated position corresponds to that of FIG. 6, i.e. to the insertion of pin 86 into bore 88 whereby hub 80 and gear 38 are immobilized relatively to box 36. Thus, the carriage 40 is at the outlying location as shown in FIG. 3, causing closure of switches 108 and 110a.

Mold drive 200 opens switch 201 in the position of platen 16 shown in FIG. 3, i.e. after the cam follower 52 has entered the rectilinear terminal section 54' of track 54 on the mold-closing stroke so that switch 110a in parallel with switch 201 is already closed by the reciprocating carriage if switch 106 is in its alternate position. Similarly, switch 202 is being opened in a platen position slightly to the left of that shown in FIG. 1 so that switch 110b in parallel therewith is already closed upon entry of the cam follower into terminal section 54". Switch 203 is opened approximately midway during the mold-closing stroke, at a point when mold portion 22 approaches the insertion position of the carriage 40 shown in FIG. 1; if the carriage by then has not cleared the path of the movable mold portion, switch 108 in parallel with switch 203 remains open and the mold drive is halted. This protective feature is independent of the position of limit switch 106.

When switch 106 is in its alternate position, the protective circuit will be interrupted if terminal switch 110a or 110b has not been closed by the time the corresponding drive-operated switch 201 or 202 is opened. A circuit is then established via a second armature of switch 110a or 110b to an alarm generator 207 even as the mold drive is halted.

Figure 10:
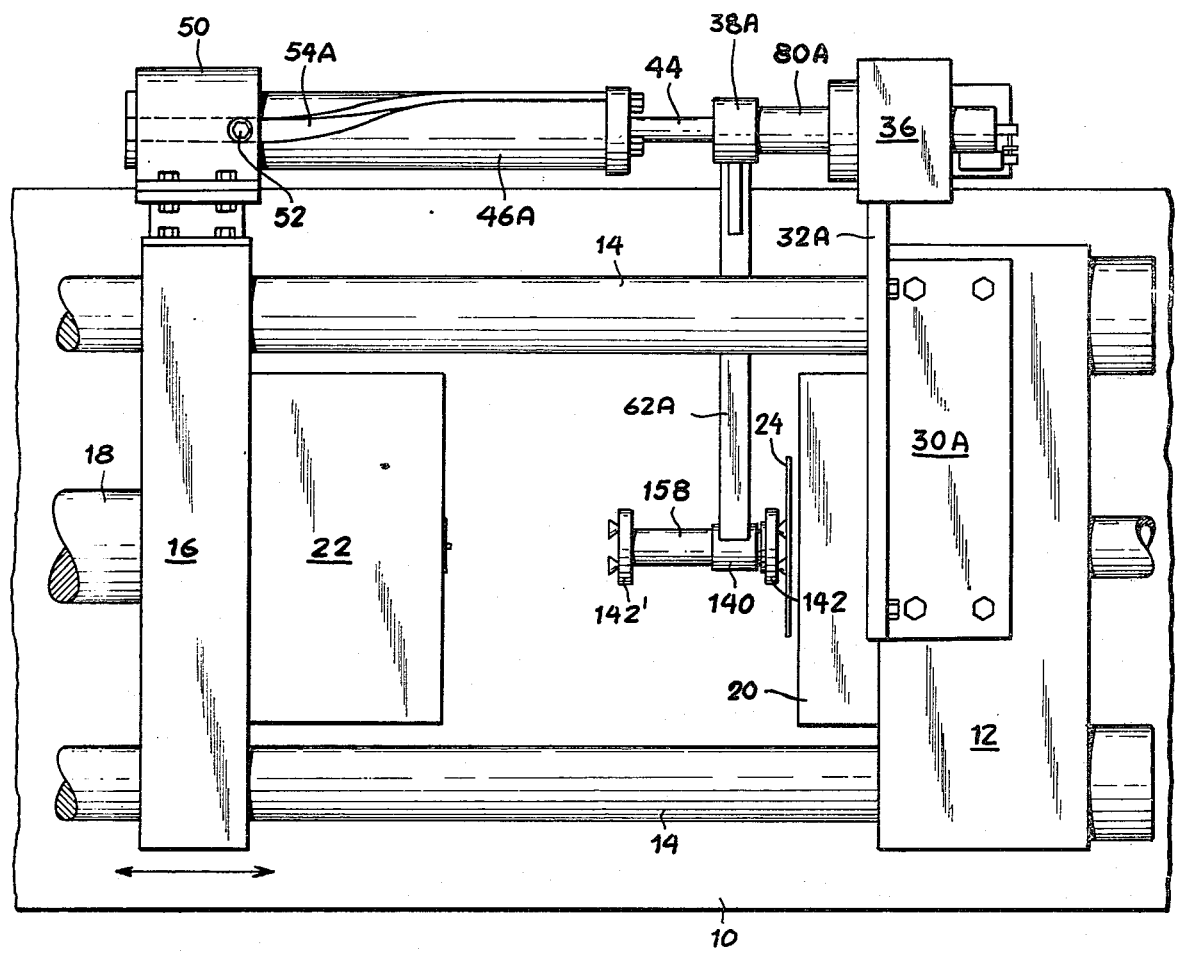
FIG. 10 is a plan view similar to FIG. 1, representing another embodiment.
Figure 11:
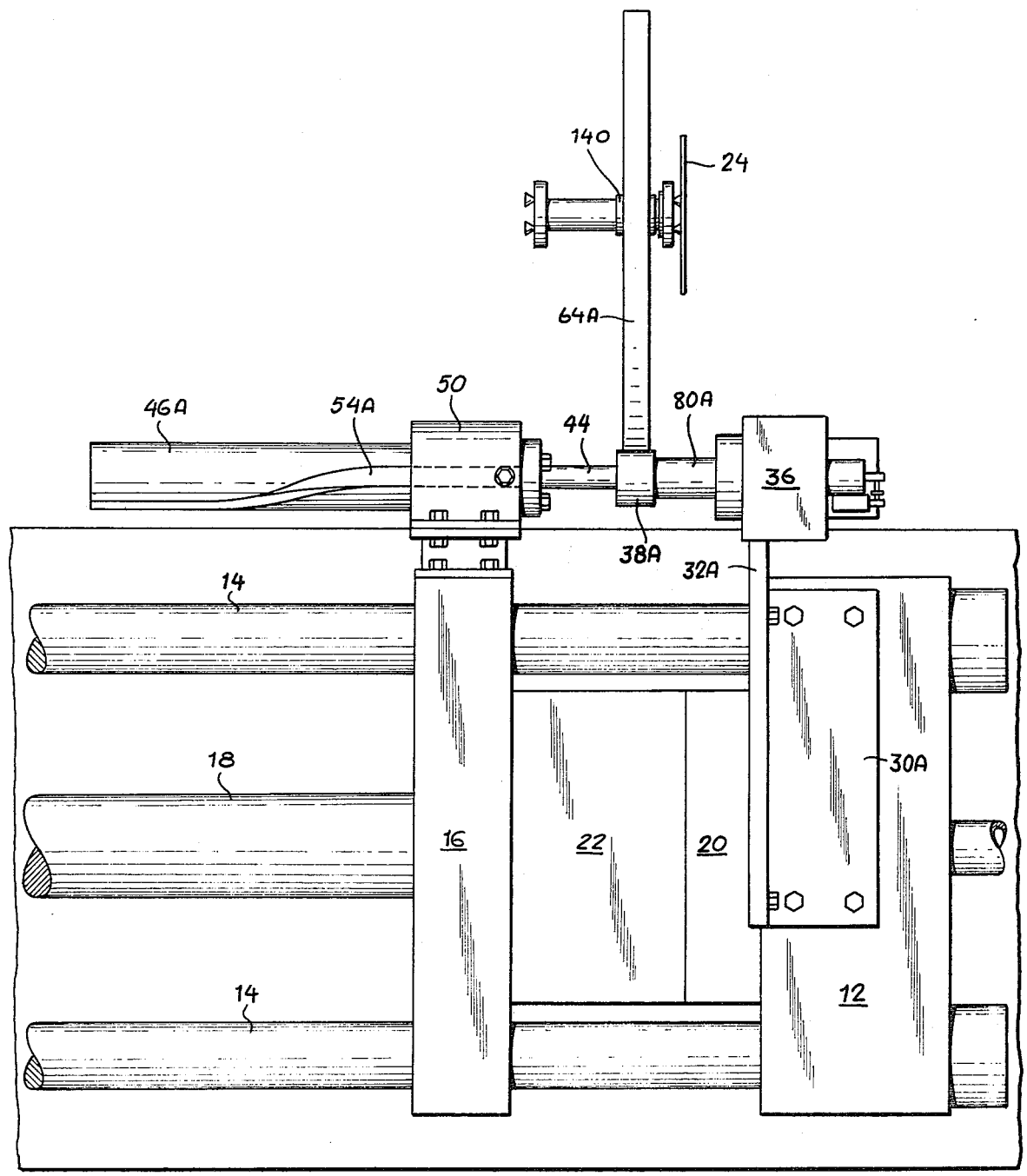
FIG. 11 is a view analogous to that of FIG. 3 but relating to the embodiment of FIG. 10.
Figure 12:
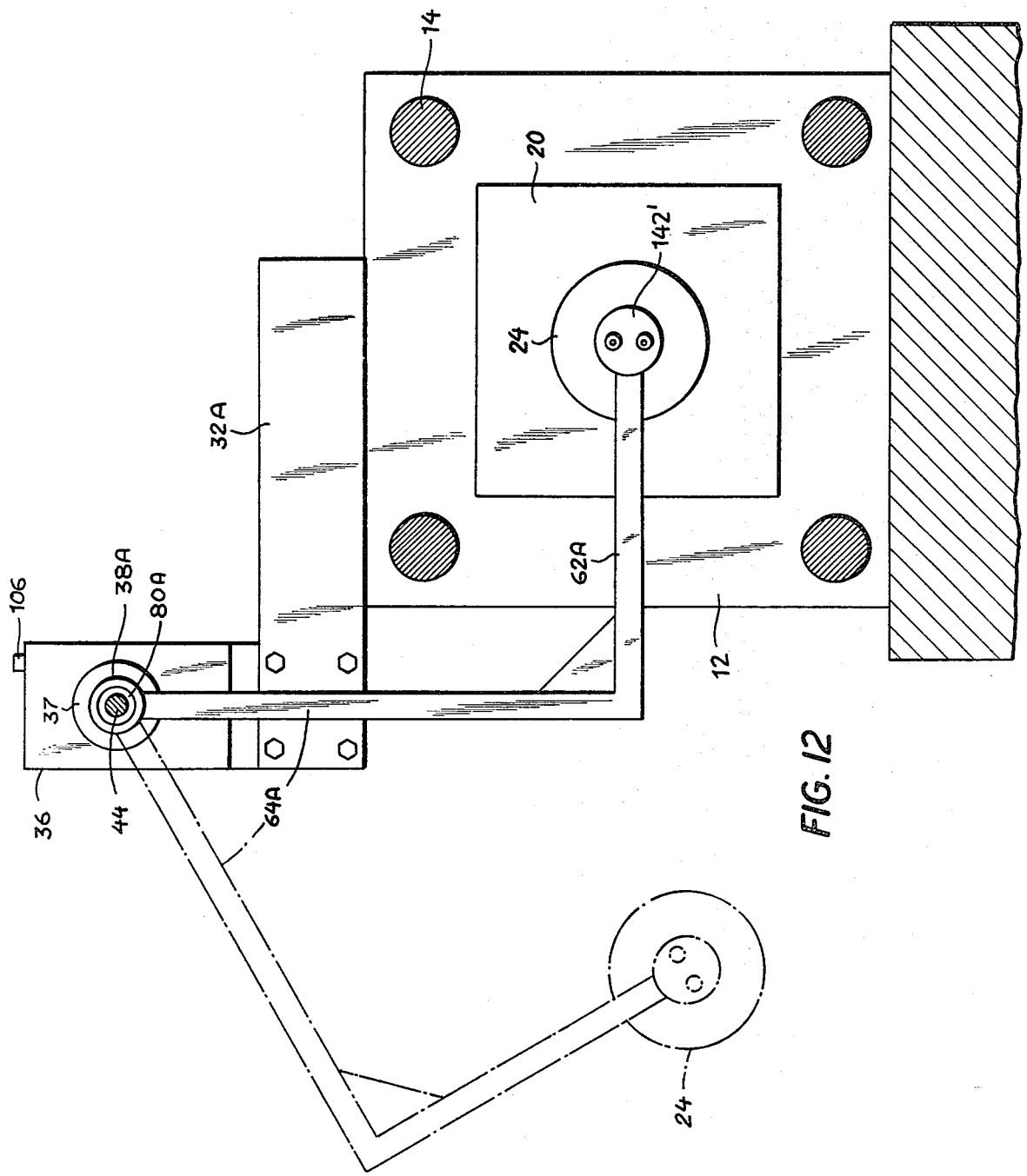
FIG. 12 is a cross-sectional view, similar to FIG. 2, of the embodiment shown in FIGS. 10 and 11.

In the embodiment of FIGS. 10–12 an elbow 62A, 64A is rigid with a mounting ring 38A which is fixedly secured, in the manner illustrated for gear 38 in FIG. 6, to a somewhat extended hub 80A idling on shaft 44 to which it can be positively coupled by the aforedescribed clutch assembly in box 36. A pick-up head carried on arm 62A of this elbow includes the cylinder 140 with its telescoped pistons 157–159 (FIGS. 4 and 5) and holding tools 142, 142', operating as in the preceding embodiment except for its inability to be rotated through 90° into a position in which the piston axis would be vertical instead of horizontal. The assembly 62A, 64A, 140 is swingable in a transverse plane, as best seen in FIG. 12, between an insertion position (full lines) and a retracted position (phantom lines), in step with the reciprocation of platen 16, when the clutch of FIG. 6 is engaged. Since the extent of this swing is less than 90°, the rotation of shaft 44 during a mold-closing or mold-opening stroke must be reduced to such an angle in comparison with the previous arrangement where that angle was almost 360°. Thus, a modified cylinder 46A rigid with shaft 44 has a flattened cam track 54A engaged by cam follower 52 in housing 50. Naturally, switches analogous to those shown at 108, 110a, 110b in the preceding Figures (operated for example by projections on mounting ring 38A) can also be provided in this embodiment.

In FIGS. 10-13 the laterally extending beam 32 supporting the box 36 of the first embodiment has been replaced by a much shorter flange 32A of a bracket 30A secured to the stationary platen 12. It will be apparent that the box and its supporting structure 30, 32 or 30A, 32A could also be mounted on the movable platen 16 or, possibly, on an intermediate platen in the case of a tripartite mold.

We claim:

1. In an injection-molding machine including a pair of relatively reciprocable platens carrying respective mold portions, a transporter for transferring articles between at least one of said mold portions and an external location, and drive means synchronized with the relative displacement of said platens for inserting said transporter between said mold portions in a mold-open position and removing said transporter during a mold-closing stroke to said external location, the improvement wherein said drive means comprises:
a structure rigid with one of said platens;
a shaft journaled on said structure, said shaft extending in the direction of selective platen reciprocation toward the other of said platens;
a rotary member on said structure coaxial with said shaft and positively connected with said transporter;
a rotary cam on an end of said shaft remote from said one of said platens, said cam having a cylindrical surface with a generally helicoidal cam track engaged by a cam follower rigid with said other of said platens whereby said shaft is rotated in one sense during a mold-closing stroke and in the opposite sense during a mold-opening stroke, said cam track terminating in two axially extending extremities holding said shaft stationary in a final phase of each of said strokes; and
clutch means on said structure selectively operable to couple said rotary member to said shaft for moving said transporter in a plane transverse to said shaft away from the path of said platens toward said external location during a mold-closing stroke and toward said path during a mold-opening stroke.

2. An injection-molding machine as defined in claim 1 wherein said rotary member is a hub idling on said shaft in an unoperated state of said clutch means.

3. An injection-molding machine as defined in claim 2 wherein said transporter comprises an elbow directly mounted on said hub for swinging in said transverse plane.

4. An injection-molding machine as defined in claim 2 wherein said structure comprises a beam extending generally transversely to said direction of reciprocation, said drive means further including a gear rigid with said hub and a carriage movable along said beam, said carriage being provided with a beam in mesh with said gear, said transporter being mounted on said carriage for rectilinear entrainment thereby.

5. An injection-molding machine as defined in claim 4 wherein said transporter comprises an elbow rigid with said carriage having an arm parallel to said beam, a rod parallel to said beam journaled on said arm, a pick-up head secured to said rod, and control means on said carriage linked with said rod for rotating same together with said pick-up head through an angle of up to about 90° upon an approach to said external location.

6. An injection-molding machine as defined in claim 5 wherein said beam is provided with a generally linear guide track having a curved extension remote from said one of said platens, said control means comprising a crank pivoted on said carriage having a projection engaging said guide track and a pitman linking said crank with said rod.

7. An injection-molding machine as defined in claim 2, 3, 4, 5 or 6 wherein said clutch means comprises a locking member on said hub alternately shiftable thereon into positive engagement with a mounting fastened to said structure and with a rotary body fastened to said shaft.

8. An injection-molding machine as defined in claim 7 wherein said locking member comprises a collar splined to said hub and provided with studs projecting therefrom in opposite axial directions for entry into respective apertures of said mounting and of said body, said collar being mechanically coupled with an actuator on said structure operable to shift said collar in either axial direction.

9. An injection-molding machine as defined in claim 8 wherein said actuator is provided with switch means for preventing a relative displacement of said platens in an intermediate position of said collar in which said studs simultaneously engage in the apertures of said mounting and of said body.

10. An injection-molding machine as defined claim 5 or 6 wherein said pick-up head is provided with oppositely facing first and second releasable holding means for substantially concurrently extracting a freshly molded workpiece from one of said mold portions and delivering an insert to the other of said mold portions for subsequent incorporation into the next workpiece to be molded.

11. An injection-molding machine as defined in claim 1, 2, 3 or 4, further comprising a protective circuit including switch means controlled by said structure for deactivating said drive means upon improper correlation of the position of said transporter with the relative reciprocation of said platens.

* * * * *